Dec. 18, 1928.  1,695,657
A. KÉGRESSE
TRACTION INCREASING DEVICE FOR ENDLESS FLEXIBLE TRACK BELTS
Filed April 2, 1926  2 Sheets-Sheet 1
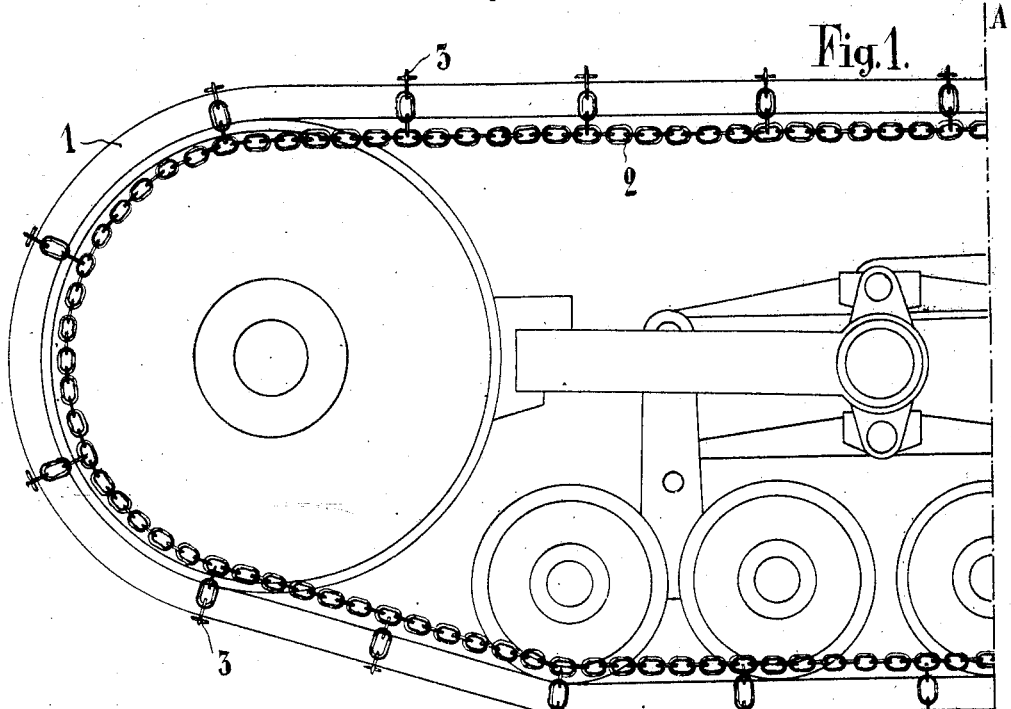
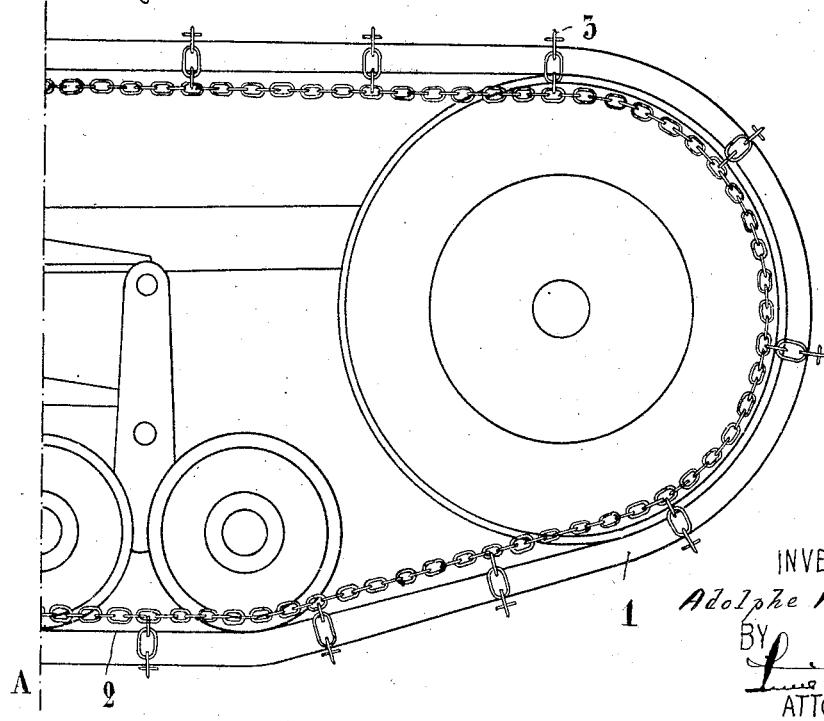
INVENTOR:
Adolphe Kégresse
BY
ATTORNEY Dec. 18, 1928.  
A. KÉGRESSE  
1,695,657  
TRACTION INCREASING DEVICE FOR ENDLESS FLEXIBLE TRACK BELTS  
Filed April 2, 1926     2 Sheets-Sheet 2

INVENTOR:  
Adolphe Kégresse  
BY  
ATTORNEY

Patented Dec. 18, 1928.

1,695,657

UNITED STATES PATENT OFFICE.

ADOLPHE KÉGRESSE, OF PARIS, FRANCE.

TRACTION-INCREASING DEVICE FOR ENDLESS FLEXIBLE TRACK BELTS.

Application filed April 2, 1926, Serial No. 99,283, and in France April 6, 1925.

Traction-increasing devices at present employed in connection with endless track belts for vehicles ordinarily consist of spikes or similar ground-engaging parts which are removably secured to the belt by bolts or other special fastenings. The spikes heretofore used require, however, somewhat long a time for fitting and for removal, and they often cause the belt to work poorly. On the other hand, on muddy ground and, particularly, on clay, the mud or slime sticking to the belt forms clots or cakes which, at times, fill up the spaces between the spikes, thereby limiting and even overcoming or destroying the efficiency thereof.

The object of my invention is to overcome these drawbacks by utilizing, as a means for increasing traction, an endless, flexible device which fits around and conformably over the belt on the outside thereof, and which, while insuring proper traction without straining the track belt itself, will automatically prevent mud from sticking to the tread of the belt.

In the accompanying drawing:

Figure 1 shows in elevation a belt fitted with a device arranged according to my invention.

Figure 2:
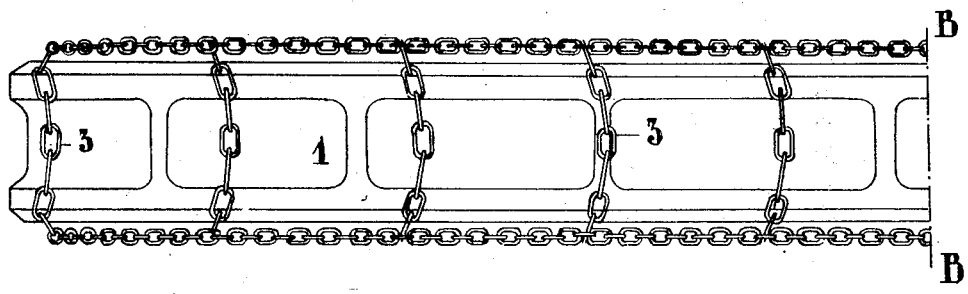
Figure 2 is a plan view of the same.
Figure 2:
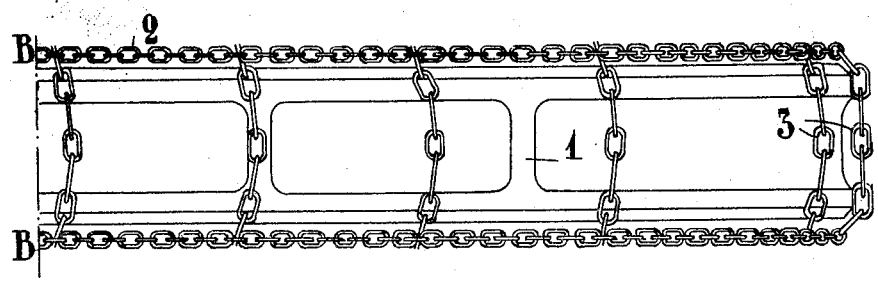

On belt 1 (Figures 1 and 2) is mounted my improved traction-increasing device, which is composed of two longitudinal side members or lines 2 made of suitable material (chains are shown on the drawing) and connected by a number of cross-pieces 3, also shown as made of chain.

Said device is constructed in such a way that the side members 2 have a developed length different from the length of the track belt itself.

As will be readily understood, a relative motion must, under these conditions, take place between the traction-increasing device and the belt proper.

As a matter of fact, the side members are carried along by the belt and, since their developed length is less than that of the belt, there must necessarily occur a relative shifting as between cross-pieces 3 and the belt itself, the result being that said cross-pieces, shifting on the outer face of the belt, effect a cleaning thereof.

The cleaning operation is carried out primarily on the upper stretch where resistance is minimum, the cross-pieces not being forced against the belt by the vehicle load.

Furthermore, the fact that all the cross-pieces are connected with the longitudinal side members 2 has the effect of distributing the strain over the whole length or span of said members, and the latter, consequently are in contact with the belt throughout its entire length.

Finally, I wish to point out that my device offers the further advantage of relieving the belt, since, owing to the traction or pull exerted, the chains apply the belt against the driving pulleys, thereby increasing the adherence of the belt to said pulleys, and thus permitting maximum stress to be developed when required without any slippage and without unduly tensioning the belt.

I claim as my invention:

The combination of an endless, flexible track belt; and an endless, flexible non-skid device fitting around and conformably over the belt on the outside thereof and embodying spaced, longitudinal side members disposed inwardly of the belt between its stretches and cross-pieces connecting the same, said side members having a developed length which is appreciably less than that of the belt so as to produce a relative displacement of mathematically-determined extent between the belt and the non-skid device at each complete revolution of the two.

In testimony whereof I affix my signature.

ADOLPHE KÉGRESSE.